United States Patent [19]

Bork

[11] Patent Number: 4,860,489
[45] Date of Patent: Aug. 29, 1989

[54] ADJUSTABLE PLANT SUPPORT

[76] Inventor: Stanley A. Bork, 6705 Shelburn Dr., Crestwood, Ky. 40014

[21] Appl. No.: 119,732

[22] Filed: Nov. 12, 1987

[51] Int. Cl.⁴ ...................... A01G 17/06; A01G 17/14
[52] U.S. Cl. ............................................ 47/47; 47/45
[58] Field of Search .................. 47/44, 45, 46, 47; 254/10.5; 81/486

[56] References Cited

FOREIGN PATENT DOCUMENTS 2055 of 1913 United Kingdom ............... 47/47
664433 1/1952 United Kingdom ............... 47/47

*Primary Examiner*—Robert A. Hafer
*Assistant Examiner*—Milan Shepel
*Attorney, Agent, or Firm*—Maurice L. Miller, Jr.

[57] ABSTRACT

A height adjustable plant support device for supporting and confining vegetables, flowers and other plants therein is disclosed. The device includes a pair of generally circular end rings and a coil constructed of flexible material such as plastic having constant diameter throughout its length connected between said end rings. In a first embodiment, a pair of spaced apart stakes are used to support the rings while in a second embodiment, the rings are supported by a single stake projecting through the middle of the rings and coil. In the first example, a first pair of clamps are slidably connected to the lower end portions of the stakes and contain hooks which open downwardly to confine a lower one of the end rings therein at or near ground level while a second pair of clamps are slidably connected to the upper end portions of the stakes and contain hooks which open upwardly to support an upper one of said end rings therein at a desired position spaced above the lower end ring. In the second example, a pair of elongated members containing hollow collars on their mid-portions are slidably disposed over the single stake, the lower one of which contains hooks on the ends thereof which open downwardly to confine the lower end ring at or near ground level and the upper one of which contains hooks on the ends thereof which open upwardly to support the upper end ring at a desired height above the ground.

6 Claims, 2 Drawing Sheets

U.S. Patent Aug. 29, 1989 Sheet 1 of 2 4,860,489
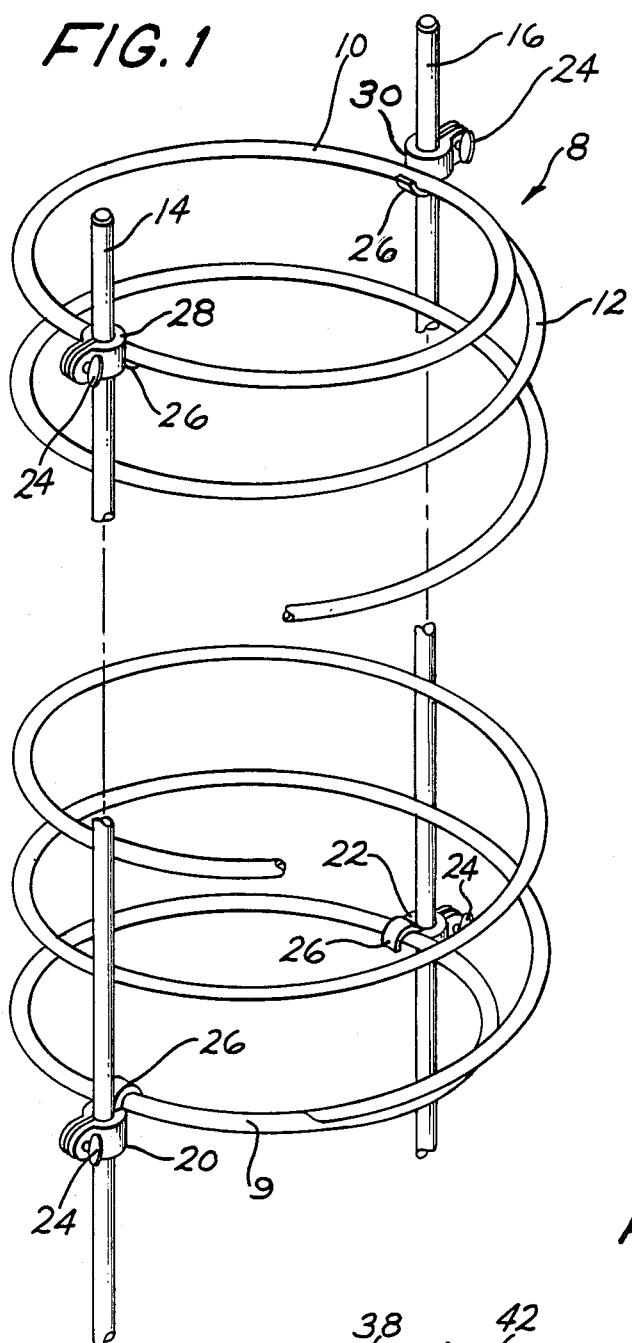
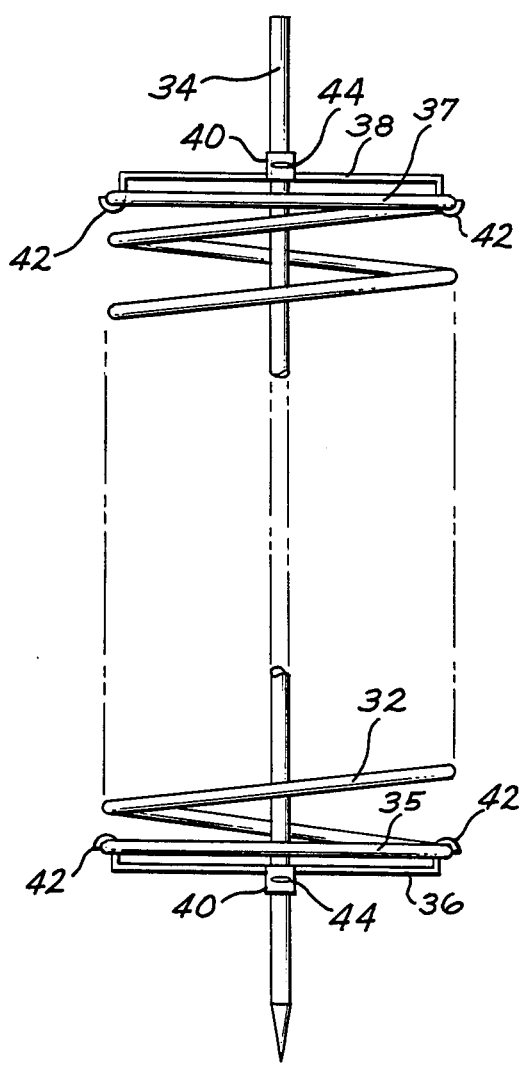
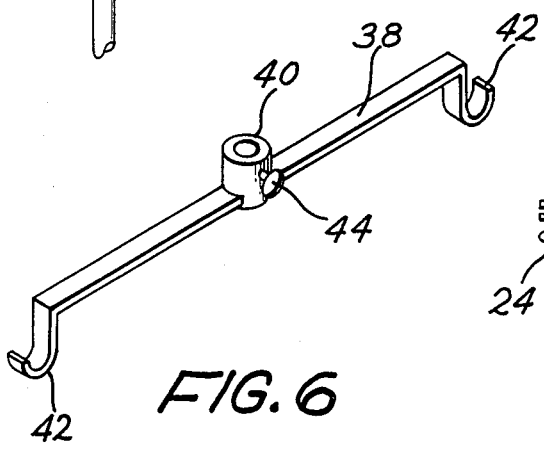
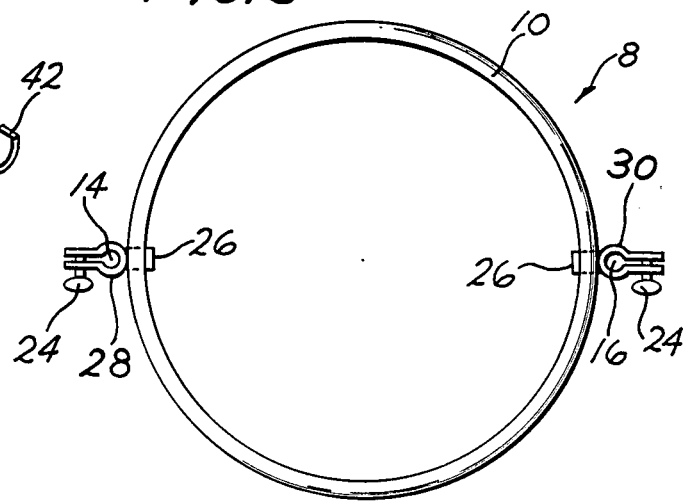

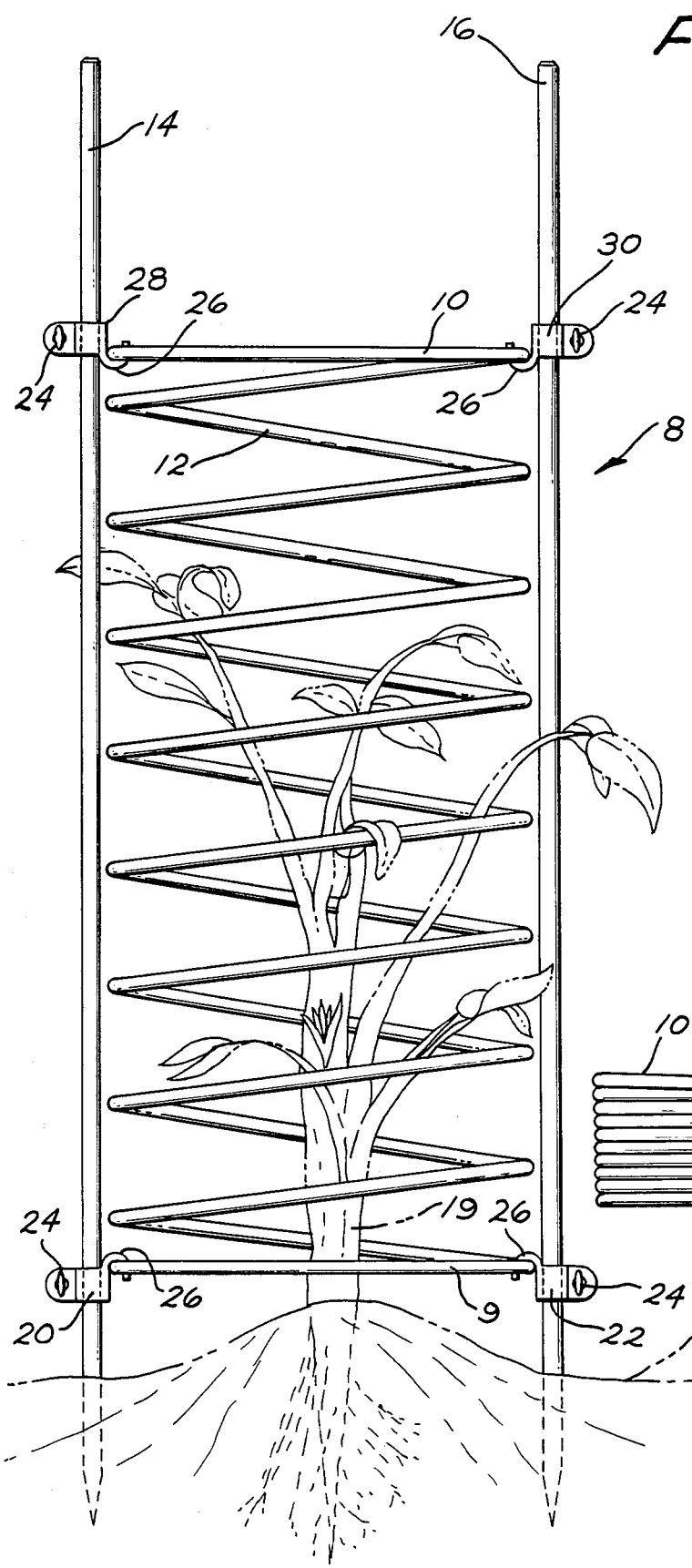
FIG. 2
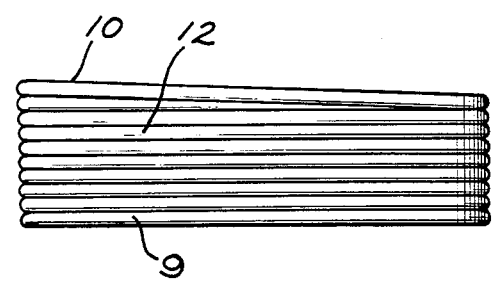
FIG. 4
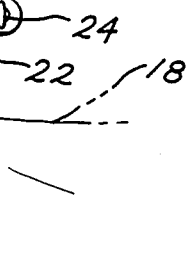

ADJUSTABLE PLANT SUPPORT

BACKGROUND OF THE INVENTION

This invention relates generally to an adjustable support for plants such as vegetables and, more specifically, to an adjustable plant support featuring a flexible, cylindrically shaped coil connected between two end rings adapted for surrounding a plant and for being expanded vertically to accommodate plant growth and for being collapsed for convenient shipping and storage.

Generally speaking, adjustable plant support devices of various types of construction have long been known in the prior art. For example, see Swiss Pat. No. 202478 published Apr. 17, 1939, employing an elongated spiral cable or band extending vertically upward from the ground in a progressively smaller radius of curvature around a stake, the upper end of which cable or band is connected directly into the stake. The cable or band can be vertically expanded by lifting the upper end thereof and attaching it to higher points on the stake to accommodate plant growth upwardly within and along the spiral.

See also U.S. Pat. No. 2,000,911 issued to W. E. Balousek on May 14, 1935 which illustrates, in reference FIG. 1, a plant support consisting of a wire extending through various vertically spaced holes in a stake so as to form a spiral through or along which to entrain a plant. The spiral is, of course, not adjustable in height along the stake. The reference patent also discloses the use of various diameter hoops of wire connected in vertically spaced relationship along a stake through which a growing plant can be entrained.

Other prior art plant support systems utilizing several different rings or hoops connected to a stake through which plants may be entrained include U.S. Pat. Nos. 2,851,823 issued to C. E. Peterson on Sept. 16, 1958; 3,061,976 issued to J. J. Carroll et al. on Nov. 6, 1962; 4,519,162 issued to W. C. Stuckey on May 28, 1985 and 4,534,129 also issued to W. C. Stuckey on Aug. 13, 1985. In these latter instances, the various hoops must be independently adjusted in height and spacing.

My invention substantially overcomes these and other problems encountered with plant support systems of the prior art.

SUMMARY OF THE INVENTION

It is an object of my invention to provide a novel adjustable plant support system.

It is a further object of my invention to provide a plant support system whose height is adjustable to accommodate plant growth by means of only a single adjustment of an upper ring thereof.

It is yet another object of my invention to provide a novel plant support system which employs an expandable, cylindrically shaped coil of constant diameter throughout connected between a pair of end rings which may be expanded vertically to accommodate plant growth and which may be collapsed into a relatively flat package for convenient shipping and storage.

Briefly, in accordance with my invention, I provide an adjustable plant support system which includes a pair of generally circular end rings, and a cylindrically shaped coil constructed of flexible material connected between the end rings. Stake means for supporting the coil and upper one of the end rings is also provided. Lastly, I provide means movably connected to the stake means for supporting the upper one of the end rings and for adjusting the length of the coil along the stake.

These and other objects, features and advantages of my invention will become apparent to those skilled in the art from the following detailed description and attached drawing figures upon which, by way of example, only the preferred embodiments of my invention are illustrated.

BRIEF DESCRIPTION OF THE DRAWINGS

FIG. 1 shows an oblique projection of an adjustable plant support employing a pair of generally circular end rings, a cylindrically shaped expandable coil connected between the rings and a pair of supporting stakes, thus illustrating one preferred embodiment of my invention.

FIG. 2 shows an elevation view of the plant support of FIG. 1.

FIG. 3 shows a plan view of the plant support of FIGS. 1-2.

FIG. 4 shows a side elevation view of the end rings and cylindrical coil portion of the plant support of FIGS. 1-3, the coil being in a collapsed state for convenient shipping and storage.

FIG. 5 shows an elevation view of an adjustable plant support employing a pair of generally circular shaped end rings, a cylindrically shaped expandable coil, a pair of coil spacing brackets or members and a single coil supporting stake, thus illustrating another preferred embodiment of my invention.

FIG. 6 shows a plan view of the upper one of the two spacing brackets shown in FIG. 5 for supporting the upper end ring.

DESCRIPTION OF THE PREFERRED EMBODIMENT

Referring now to the drawing figures, there is shown in one preferred embodiment of my invention, an adjustable plant support 8 including a pair of generally circular end rings 9, 10 and a cylindrical coil 12 constructed of a suitably flexible material such as plastic or the like connected between the rings 9, 10. The rings 9, 10 and coil 12 are adapted for being mashed into a relatively flattened or collapsed state for shipping and storage purposes as shown in FIG. 4 and for being expandable along the longitudinal axis of the coil 12 as illustrated in FIGS. 1-2. A pair of elongated stakes 14, 16 which can be round, as shown, or square in cross-section and which have lower ends suitable for being driven into the ground 18 on opposite sides of a plant 19 as shown in FIG. 2, support the upper end ring 10 at two positions opposite one another. A pair of suitable clamps 20, 22, which are slidably disposed on lower end portions of the stakes 14, 16, respectively, and which can be loosened and tightened by means of wing nuts 24, have hooks 26 connected thereto which open downwardly to hold the lower end ring 9 in place at or near ground level. Similarly, a pair of clamps 28, 30 fasten around upper end portions of the stakes 14, 16, respectively, and can also be tightened or loosened by means of wing nuts 24. The clamps 28, 30 also contain hooks 26 which, in this case, open upwardly to confine and support the upper end ring 10 therein so that the coil 12 can be supported in a state of vertical expansion. By adjusting the height of the clamps 28, 30, the upper ring 10 can be raised vertically as the plant 19 grows during the course of the growing season to thus accommodate the limbs and branches of the plant 19 as they grow.

Referring now to FIGS. 5-6, there is shown, in another preferred embodiment of my invention, a cylindrical coil 32 constructed of suitable flexible material such as plastic, the same as the coil 12 of the previous example of my invention. In the present example, the coil 32 is suspended from and around a single stake 34 having a sharpened lower end for being driven into the ground. A pair of elongated members or brackets 36, 38 contain hollow cylindrically shaped collars 40 on their midportions through which the stake 34 extends. The ends of the brackets 36, 38 contain hooks 42 which are adapted to hold the lower ring 35 at or near ground level and the upper ring 37 at a higher level as desired. The coil 32 may be expanded to accommodate the growth of a plant therein by adjusting a wing nut 44 to raise the upper bracket 38 and ring 37 as desired. The brackets 36, 38 thus adjustably affix the rings 35, 37 to the stake 34.

Although the present invention has been explained with respect to specific details of certain preferred embodiments thereof, it is not intended that such details limit the scope of this patent otherwise than as specifically set forth in the following claims.

I claim:

1. An adjustable plant support comprising
  a pair of generally circular end rings,
  a cylindrically shaped coil constructed of flexible material connected between said end rings,
  stake means supporting said coil and an upper one of said end rings, stake means comprising two stakes adapted for being driven into the ground in spaced apart relation to one another on opposite sides of a plant for supporting opposite portions of said end rings over and around said plant, whereby said coil is disposed over and around said plant, and
  means movably connected to said stake means for supporting an upper one of said end rings and for adjusting the length of said coil along said stake means, said movably connected means comprising at least two pairs of hook assemblies slidably adjustable along said stake means for confining a lower one of said end rings at or near ground level and for supporting an upper one of said end rings above the lower end ring.

2. The adjustable plant support of claim 1 wherein said coil and end rings are constructed of plastic.

3. The adjustable plant support of claim 1 wherein each of said pairs of hook assemblies comprise
  a adjustable clamp,
  means for adjusting said clamp to tighten and loosen the same on said stake means, and
  hook means connected to said clamp to confine a portion of said end rings therein.

4. The adjustable plant support of claim 1 wherein each of said pairs of hook assemblies comprise
  an elongated member defining a hollow collar on a mid-portion thereof,
  a hook connected upon opposite ends of said member for confining opposite portions of one of said end rings therein, and
  means for loosening and tightening said collar for adjusting and fixing the vertical position of said member on said stake means.

5. An adjustable plant support comprising
  a pair of generally circular end rings,
  a cylindrically shaped coil constructed of flexible material connected between said end rings,
  a pair of stakes adapted for being driven into the ground in spaced apart relation to one another on either side of a plant for supporting said end rings,
  a first pair of clamps slidably disposed around lower end portions of said stakes, said first pair of clamps being adjustable by tightening or loosening the same to render them securely fastened to and slidable along said stakes, respectively,
  a second pair of clamps slidably disposed around upper end portions of said stakes, said second pair of clamps being adjustable by tightening and loosening the same to render them securely fastened to and slidable along said stakes, respectively,
  a first pair of hooks connected to said first pair of clamps and opening downwardly to confine a lower one of said end rings therein at or near ground level, and
  a second pair of hooks connected to said second pair of clamps and opening upwardly to support an upper one of said end rings therein spaced above said lower one of said end rings.

6. An adjustable plant support comprising
  a pair of generally circular end rings,
  a cylindrically shaped coil constructed of flexible material connected between said end rings,
  a stake adapted for being driven into the ground adjacent to a plant and extending through and along the longitudinal axis of said coil and end rings,
  a first hook assembly comprising
    a first elongated member defining a first hollow collar on a mid-portion thereof slidably disposed over said stake,
    a first pair of hooks attached to the ends of said first member and opening downwardly to confine a lower one of said end rings therein at or near ground level, and
    means to tighten and loosen said first collar on said stake to fix and adjust the height of said first hook assembly above ground, and
  a second hook assembly comprising
    a second elongated member defining a second hollow collar on a mid-portion thereof slidably disposed over said stake,
    a second pair of hooks attached to the ends of said second member and opening upwardly to support an upper one of said end rings therein spaced above said lower end ring, and
    means to tighten and loosen said second collar about said stake to fix and adjust the height of said second hook assembly above said first hook assembly.

* * * * *